(12) United States Patent
Khambekar et al.

(10) Patent No.: US 7,261,192 B2
(45) Date of Patent: Aug. 28, 2007

(54) BRAKE DISK AND METHOD FOR THE PRODUCTION THEREOF

(75) Inventors: Suryakant Khambekar, Munich (DE); Hans Baumgartner, Moosburg (DE); Wolfgang Pahle, Heilbronn (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/005,080

(22) Filed: Dec. 7, 2004

(65) Prior Publication Data

US 2005/0082123 A1 Apr. 21, 2005

Related U.S. Application Data

(63) Continuation of application No. 10/436,464, filed on May 13, 2003, which is a continuation of application No. PCT/EP01/12719, filed on Nov. 2, 2001, now abandoned.

(30) Foreign Application Priority Data

Nov. 13, 2000 (DE) .................. 100 56 161

(51) Int. Cl.
 *F16D 65/12* (2006.01)
(52) U.S. Cl. .................. 188/218 XL; 188/251 M
(58) Field of Classification Search ......... 188/218 XL, 188/264 A, 264 AA, 251 M
 See application file for complete search history.

(56) References Cited

U.S. PATENT DOCUMENTS

| | | | | |
|---|---|---|---|---|
| 4,227,756 A | * | 10/1980 | Bhushan | .............. 384/106 |
| 4,715,486 A | * | 12/1987 | Burgdorf et al. | ........ 192/107 M |
| 5,884,388 A | | 3/1999 | Patrick et al. | |
| 6,053,990 A | * | 4/2000 | Persson et al. | .............. 148/321 |
| 6,290,032 B1 | * | 9/2001 | Patrick et al. | ........ 188/218 XL |
| 6,318,518 B1 | * | 11/2001 | Shinohara et al. | .... 188/264 AA |
| 6,855,428 B2 | * | 2/2005 | Lau et al. | .................. 428/408 |
| 2003/0070891 A1 | * | 4/2003 | Nakao et al. | ......... 188/218 XL |
| 2003/0180527 A1 | * | 9/2003 | Bauer et al. | ................. 428/323 |

FOREIGN PATENT DOCUMENTS

| | | |
|---|---|---|
| DE | 843 634 | 10/1951 |
| DE | 26 02 335 | 7/1976 |
| DE | 43 21 713 A1 | 1/1994 |
| DE | 296 17 774 U1 | 1/1997 |
| DE | 298 13 236 U1 | 11/1998 |
| DE | 197 47 111 A1 | 5/1999 |
| EP | 0525439 * | 7/1992 |
| EP | 0 525 439 A1 | 2/1993 |
| EP | 0 674 114 B1 | 9/1995 |
| JP | 62-088828 | 4/1997 |
| WO | WO89/09889 | 10/1989 |
| WO | WO91/10840 | 7/1991 |

OTHER PUBLICATIONS

Article entitled "Wear-Inhibiting Layers" by Kunst., et al., vol. 436, *Kontakt & Stadium Werkstoffe*.

* cited by examiner

*Primary Examiner*—Devon Kramer
(74) *Attorney, Agent, or Firm*—Crowell & Moring LLP

(57) ABSTRACT

The invention relates to a brake disk having axial friction surfaces, preferably for land vehicles, in particular, an internally ventilated brake disk having two friction rings that are joined via connecting elements, whereby one of the axial outer surfaces of the brake disk is provided with a metallic non-ceramic coating. The injection molded coating is preferably formed during a flame spraying, arc spraying or plasma spraying coating method.

1 Claim, 5 Drawing Sheets

BRAKE DISK AND METHOD FOR THE PRODUCTION THEREOF

CROSS-REFERENCE TO RELATED APPLICATIONS

This application is a continuation of application Ser. No. 10/436,464, filed May 13, 2003 now abandoned which is a continuation of PCT Application No. PCT/EP01/12719 filed on Nov. 2, 2001.

BACKGROUND AND SUMMARY OF THE INVENTION

The invention relates to a brake disk, preferably for land vehicles, having axial friction surfaces, particularly an internally ventilated brake disk having two friction rings connected by way of webs, and to a method for its production.

A brake disk of the above-mentioned type is known from German Patent document DE G 298 13 236. The brake disk illustrated in that document is particularly suitable for the high stress occurring in the case of commercial vehicles and was also found to be resistant to wear. For everyday use, a service life of 300,000 km or more in trucks is not unusual. Nevertheless, a basic demand exists for a further increase of the brake disk's resistance to wear while the manufacturing costs of the brake disk should remain economically justifiable.

Although, more recently, the use of ceramic brake disks has been discussed which, in the sports car field, are already being installed in small series, the manufacturing costs of such brake disks are within the range of several thousand Deutsche Mark. Particularly in the field of commercial vehicles, the use of such brake disks therefore seems uneconomical. There is, on the contrary, a demand for a significant increase of the resistance to wear while the manufacturing costs of the brake disk remain justifiable.

However, it is not simply possible to increase the resistance to wear of the brake disk only by increasing the hardness of the brake disk material because the brake disk should not only be resistant to wear but must also meet additional marginal conditions.

By means of the alloyed types of gray cast iron disclosed in German Patent Document DE G 298 13 236, particularly the demands on the heat crack resistance could be improved while the dissipation of heat is simultaneously good and the efficiency is therefore high. In the case of these materials, the wear behavior is also improved in comparison to conventional brake disks made of gray cast iron by the formation of secondary carbides in the structure. These requirements are satisfactorily met for most demands in the vehicle construction by gray cast iron materials. Nevertheless, there is a demand for another significant increase of the wear resistance of the brake disk. However, such an increase of the wear resistance cannot simply be achieved in that the hardness of the gray cast iron is increased by a variation of the alloying additions because other characteristics of the brake disk may deteriorate with an increasing hardness, such as its tendency to form cracks or its thermal conductivity. In the event of an extreme stressing, brake disks with an improved design and selection of material may still have an unacceptable heat crack formation. Another remaining problem with brake disks made of gray cast iron materials is a non-uniformity of the braking torque ("brake judder"), which occurs under certain operating conditions.

Brake disk materials therefore have to meet very different demands, which partly require opposing characteristics for the materials.

Thus, they are used for transmitting the braking torque. For this purpose, they should have a high stability, a high breaking elongation capacity and a high modulus of elasticity.

As a result of the heat occurring during braking, these brake disk materials should also permit high or good heat dissipation. For this purpose, they should have a high thermal conductivity and a high degree of emission.

A high heat crack resistance should also be demanded. For this purpose, the brake disks should have a high thermal conductivity, a low modulus of elasticity and a low thermal expansion.

A low wear of the disk brake is also desirable. For this purpose, a high hardness, a high strength and a high oxidation stability are advantageous.

Frictional characteristics which are as uniform as possible also require a high homogeneity of the material even in the case of high thermal stress, as well as the avoidance of fluctuations in wall thickness as a result of a non-uniform wear.

As in the case of all unsprung masses at the vehicle axle, a weight which is as low as possible, and manufacturing costs which are as low as possible, are also desirable.

The gray cast iron used in the case of the brake disk of the above-mentioned type—particularly with a C-content of from 3.8 to 4%, an Mo-content between 0.6 and 0.8%, and preferably a Cr-content of from 0.2 to 0.3%, as well as preferably other additions, such as Mn, P, S, Cu and/or Ni—is already quite resistant to wear while the manufacturing costs are relatively low.

However, in the field of commercial vehicles, where a disk change may require relatively high expenditures, particularly an increase of the wear resistance to such an extent that, during the service life of the vehicle, a disk change can be eliminated, would be desirable. In this case, the brake disk costs may definitely also increase, but only such that an economic advantage still remains in comparison to the costs of a disk change.

In view of the above problems, the invention is based on the object of providing a brake disk, preferably a gray cast iron brake disk which, while its manufacturing is easy, is as wear-resistant as possible. Preferably, the other characteristics of the brake disk should thereby be impaired as little as possible in comparison to the pertaining state of the art. An advantageous manufacturing method for brake disks according to the invention should also be provided.

The invention achieves this object by providing a brake disk with axial friction surfaces, preferably for land vehicles, particularly an internally ventilated brake disk having two friction rings connected by way of webs. The brake disk is provided on at least one of its axial friction surfaces, in sections or entirely, with a metallic, non-ceramic coating, and a method of making the same.

The invention accordingly provides a brake disk with axial friction surfaces, preferably for land vehicles, which brake disk may also be internally ventilated and is provided at least on one of its axial friction surfaces, in sections or entirely, with a metallic non-ceramic coating.

Since, instead of a ceramic coating, a metallic coating is used, the adherence of the coating is optimized in a simple manner in comparison to brake disks with ceramic coatings. This brake disk is particularly suitable for trucks, but can also be used in passenger cars.

Particularly preferably, the brake disk has a disk-type core made of a cast iron material which, at least on one of its axial outer surfaces, is provided with a metallic injection-molded coating or an explosion coating.

Although coatings which protect against wear on friction surfaces of brake disks are known per se (European Patent Document EP 0 674 114 B1), these coatings on a ceramic bases have favorable wear characteristic but present adhesion problems because of different characteristics compared to the base material of the gray cast iron brake disks and because of the thermal shock stressing that occurs during coating.

In contrast, the invention provides, in a simple manner, a cost-effective coating of brake disks which protects against wear and is compatible with brake disk materials made of cast iron—particularly gray cast iron materials. Here, it is surprisingly possible, while retaining the favorable characteristics of these materials optimized for the use in brake disks, to increase the service life with respect to wear such that the brake disks have to be exchanged even less often; thus, for example, in rarely occurring, particularly wear-intensive applications because of reaching the wear limit.

Furthermore, the coating permits a reduction of the heat crack formation of the brake disk, the effect of the brake judder because of thickness fluctuations of the brake disk arising during the operation also being avoidable.

In the case of the invention, the coatings are preferably applied to the brake body made of gray cast iron by a thermal spray coating method, which brake body thereby forms a type of core.

Although thermal spray coating methods are known per se, thus, for example, when coating piston rings (see, for example, K. Kirner, "Application of Layers to Technical Parts by Means of Thermal Spraying Methods"; from: Kunst et al "Wear-Inhibiting Layers", Volume 436, *Kontakt & Studium, Werkstoffe*, Expert Publishers). Their use in the field of coatings of brake disks for producing a metallic brake disk coating, however, has not yet been considered because it was believed that the metallic injection molded coatings would impair the other desired characteristics of the ferrous material core.

When such thermal sprayed layers are used on gray cast iron brake disks, however, it was now surprisingly recognized that, because of the occurring metallurgical reaction with the material of the brake disk as well as the solidification course of the sprayed layer influenced by the high heat storing capacity of the brake disk, these thermal sprayed layers affect not only the wear behavior of the brake disk in a surprisingly positive manner even at high temperatures, but also reduce the heat crack formation and the braking torque fluctuations.

Alternative manufacturing methods to the preferred and proven arc welding are flame spraying, plasma spraying and explosion coating.

The invention therefore creates a protective layer for brake disks made of cast iron materials, which is applied to the friction surfaces of the brake disk by thermal spraying, in which case the sprayed-on material is a metal. In particular, the sprayed-on material is selected such that, in addition to the protection against wear, a protection against oxidation and against undesired metallurgical changes of the friction surface is achieved.

The injection molded coating preferably consists of a metal which is harder than the core, particularly unalloyed or alloyed steel. The injection molded coating preferably consists of a steel alloy containing Cr. In particular, the Cr content of the coating is between 10 and 20%, between 13 and 19%, between 15 and 17% or particularly preferably at 16%.

A brake disk has been particularly successful in the case of which the alloyed steel forming the coating contains the following additions: 16% Cr, 0.44% Ni, 0.43% Mn, 0.01% Mo, and 0.36% C.

It also proved to be useful that the core consists of a cost-effective gray cast iron. The gray cast iron forming the core is preferably a highly carburized gray cast iron which has a carbon content of from 3.7 to 4.0% and contains Mo and/or Cr. In particular, the Mo content of the core is at 6 to 8% and the Cr content is at less than 5%.

Axial coating thicknesses of from 0.3 to 1.5 mm, preferably 0.5 to 1.2 mm, particularly 0.6 to 0.9 mm, have also been successful. By means of a coating thickness of 0.7 mm, using a injection molded coating with a high Cr content, a doubling of the service life of the brake disk can often be achieved.

The invention is preferably used in the case of commercial vehicle brake disks with a disk thickness of from 38 to 45 mm and an air channel width of 12 mm.

The ratio between the disk thickness D1 and the air channel width D preferably meets the condition $3.2<=D1/D2<=4$.

Reciprocally engaging contours, preferably a groove structure and/or a knob structure, are preferably constructed in the transition area between the core and the injection molded coating.

The friction rings expediently have at least one axial collar on the inner and/or outer circumferential edge, the height of this collar corresponding preferably to the axial dimension of the coating.

Other objects, advantages and novel features of the present invention will become apparent from the following detailed description of the invention when considered in conjunction with the accompanying drawings.

DETAILED DESCRIPTION OF THE DRAWINGS

Figure 1:
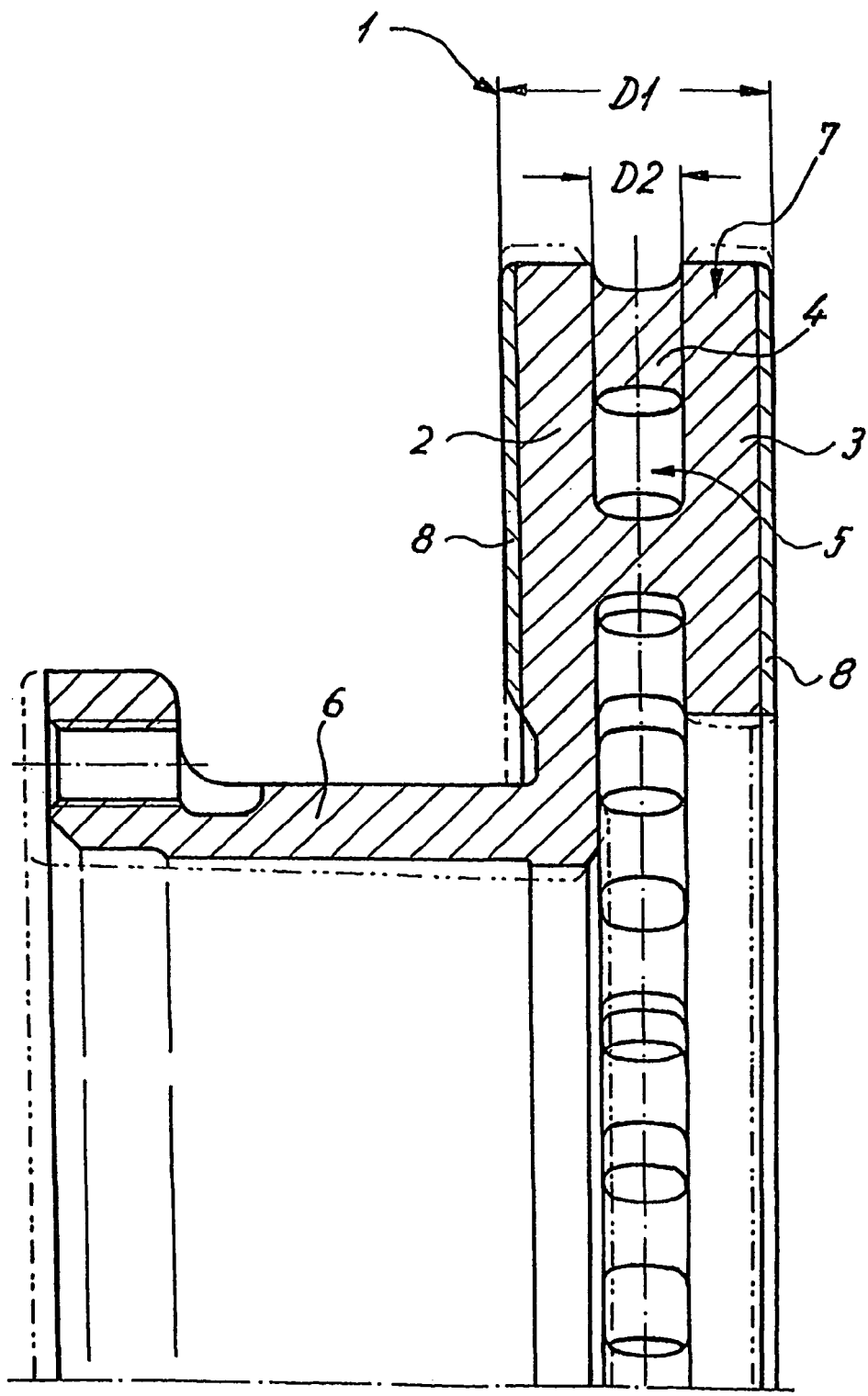
FIG. 1 is a sectional view of a first embodiment of a brake disk according to the invention.

FIG. 1 shows a brake disk 1 having two friction rings 2, 3, which are connected with one another in one piece by way of webs 4, a ventilating duct 5 being constructed between the friction rings 2, 3 as well as the webs 4. A pot-shaped projection 6 for fastening the brake disk on a wheel hub (not shown here) is illustrated on one friction ring 2.

The two friction rings 2, 3 as well as the webs (and here also the projection 6) together form a one-piece brake disk body or a core 7. On its two axial outer surfaces, this core 7 is provided, in each case, with a wear-resistant metallic non-ceramic injection-molded coating 8. According to FIG. 1, the complete axial outer surfaces are covered with the injection-molded coating 8.

Thus, during braking, until the injection-molded coating 8 is completely worn off, only this injection-molded coating 8 is subjected, as the friction surface, to the abrasion occurring during the braking. Since the metallic injection-molded coating 8 is harder than the core 7 of gray cast iron, the service life of the brake disk is increased. However, since the essential volume percent of the brake disk, specifically the core 7, consists of gray cast iron, its advantageous other characteristics, for example, with respect to the thermal conductivity and the tendency to form cracks are retained, or are even improved, by the application of the injection-molded coating.

Figure 2:
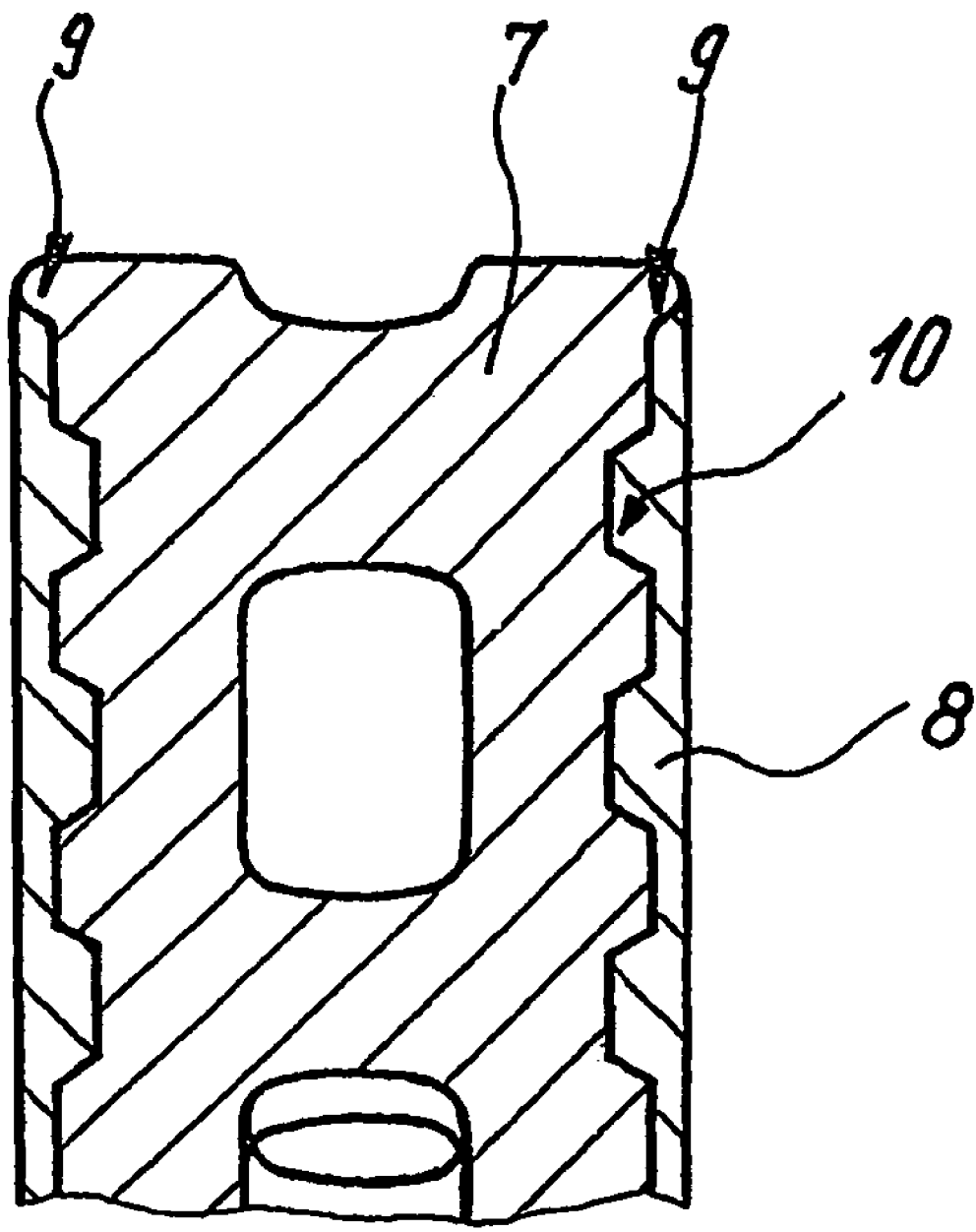
FIG. 2 is a sectional view of the area of the friction rings of another embodiment of a brake disk according to the invention.

As an alternative, it is contemplated according to FIG. 2 to mold a type of axial collar 9 to the core 7 in the outer and/or inner circumferential area, the axial dimension of the core here corresponding to the axial dimension of the coating 8. If an axial collar 9 is constructed at the inner as well as at the outer edge of the friction surfaces, a type of indentation for receiving the coating 8 (not shown here) is created between the two collars 9.

According to FIG. 2, it is also provided to construct between the coating 8 and the core 7 not a planar boundary surface, but rather a spatial surface structure, at which the injection-molded coating 8 and the core axially engage in one another.

This structure is created in that trapezoid grooves 10 are formed in the axial outer surfaces of the core 7, which grooves 10 are filled by the coating 8. The coating 8 axially has such a thick construction that it extends axially beyond the grooves. As a result, a flat coating area is formed axially outside the grooves 10, which coating area covers the axial outer surfaces of the brake disk with the exception of the area of the collars 9.

The construction of a spatial structure, illustrated only as an example in FIG. 2, in the boundary area between the coating 8 and the core 7 has several advantages. For example, the spatial structure avoids an abrupt transition to the gray cast iron material after the abrasion of the complete injection-molded coating 8, and thus a relative abrupt transition to another braking behavior. Furthermore, the adhesion of the injection-molded coating 8 on the friction rings is improved; among other things, because the contact surface between the coating 8 and the core or the friction rings 2, 3 is enlarged.

In the transition area between the core 7 and the injection-molded coating 8, a wide variety of different geometries can be implemented; thus, for example, reciprocally engaging trapezoidal or rectangular shapes or, for example, a knob structure on the surface of the friction rings 2, 3, which is covered by the injection-molded coating 8.

In the following, additional details of the manufacturing of the brake disk according to the invention are described.

Within the scope of the invention, the arc spraying method was found to be particularly useful for producing the injection-molded coating on the brake disk. In this case, the coating is applied from an arc, which has a temperature of up to 4,000° C., by means of an atomizer gas,—in the simplest case, compressed air—to the surface of the brake disk 1 in thin layers while the latter is moved along. For example, approximately 250 to 450 g coating material for each side is sprayed onto the friction surfaces of a brake disk 1 of a diameter of 430 mm and a weight of approximately 25 kg.

Because of the large mass of the brake disk 1 in conjunction with the high thermal conductivity of the brake disk material, after impacting the spraying drops onto the brake disk 1, and after a brief metallurgical reaction with the brake disk material, an extremely rapid solidification and cooling of the sprayed-on material will take place. As a result, there is a partially suppressed arrangement of structure in the sprayed coating 8 which, in comparison to the normal structure of the same material, results in considerably improved mechanical and wear characteristics.

As the base material, preferably a ferrous material, and more preferably a gray cast iron material, is used, among others. Also, other cast materials are possible in principle.

Gray cast iron brake disks, as a rule, have a carbon content of several (for example, 3 to 4) percent in weight. Particularly, the gray cast iron materials in German Patent document DE G 298 13 236 are carburized to the saturation limit for achieving the highest possible thermal conductivity. Here, carbon contents of from 3.7 to 4.0 percent in weight are realized. The metallic drops blown out of the arc, when impacting on the brake disk, react with constituents of the brake disk material, particularly with the high fraction of existing carbon, and in this case form a hard metal-carbon compound.

Another preferred coating material according to material No. 1.4122 has, for example, the following composition in an analysis (percent in weight):

0.44% Ni,
0.43% Mn,
1.01% Mo,
0.36% C

In connection with the other alloy additions as well as the carbon, the high chromium fraction will form chrome carbon by which the resistance to wear of the sprayed layer is increased.

The formation of heat cracks in the brake disk friction surface is caused by the following mechanism. During the braking operation, heat enters the outermost layer of the friction surfaces, which heat, because of the limited thermal conducting capacity, first leads to a heat accumulation connected with very high temperatures in this outermost layer.

Because of the high temperatures, the outermost layer wants to expand. However, this heat-caused expansion is suppressed because the base material of the brake disk is not yet heated correspondingly.

As a result of the occurring high compressive strain, the outermost layer of the friction surface starts to flow. However, during the cooling of the brake disk friction surface occurring after the braking operation, the now occurring shrinkage of the outermost layer of the friction surface is also suppressed, so that now excessive tensile stress will occur and this outermost layer of the friction surface will crack. At first, these heat cracks have a very fine construction. However, repeated stress in the above-described manner will cause the cracks to grow.

The thermal sprayed layer will influence this heat crack formation such that, because of the higher stability of the coating material in comparison to gray cast iron, the flowing of the material in the heating-up phase during the braking does not occur as rapidly, and the high tensile stress in the cooling phase is therefore suppressed, whereby, in connection with the higher stability of the coating material, the crack formation is avoided.

Judder problems in the case of brake disks are caused by thickness fluctuations of the brake disk friction ring, which occur as a result of manufacturing faults or as a result of operational influences.

Such a sequence of operational influences may consist of localized flattenings of the friction surfaces which are caused during driving, thus in the unbraked condition, as a result of a periodical beating of the brake linings against the brake disk (cold judder).

On the part of the brake disk, this phenomenon can be avoided only by the best possible resistance to wear with respect to the described stress. This increased wear resistance is achieved by the thermal sprayed layers, so that thereby a remedy against cold judder is also provided.

A second form of judder is caused by structural changes of the brake disk material under the effect of heat. Here, a structure of hard material fractions is formed locally, partly as a result of reactions with the brake lining material, which structure also has a volume enlargement in comparison to the basic structure, so that these converted portions grow out of the brake disk friction surface. Since, because of the hard material fraction, these portions also wear off less than the unconverted areas of the friction surface, this growing-out is intensified with an increasing wear of the brake disk, and thereby also the resulting brake judder. Since relatively inert materials can be used for the thermal sprayed layers, such as the described chrome steel, the described friction surface changes and thus the hot judder can also be avoided.

An advantageous coating process—arc spraying—for producing a brake disk according to the invention will be described in detail in the following.

First, a metal-cutting pretreatment of the unfinished cast body is recommended; for example, by means of precision-turning to a friction ring thickness measurement which is below the desired final measurement by the amount of the desired coating thickness.

It is recommended that the brake disk then be cleaned from machining residues. A mechanical cleaning and a roughening by means of blasting with fine corundum or a similar blasting material with comparable characteristics is recommended. After the machining residues have been cleaned off the brake disk, a roughening of the surface also takes place; for example, preferably an elimination of oxidation layers by means of particle blasting.

Coating of the Brake Disk:

The following process parameters are preferably used:

Spray wire: Material No. 4122; diameter 1.6 mm

Spray runs: 5 individual runs with 160 mm/min parallel advance

Rotational workpiece speed: 60 rotations/min

Layer thickness: Approximately 0.7 mm

Spraying parameters: Current intensity 300 A, voltage 30 V

Atomizer gas: 80 qm/h compressed air at 5 bar

Wire quantity per disk: Approximately 0.8 kg

Coating time: 3 min.

In addition to arc spraying, flame spraying and plasma spraying can also be used for coating the brake disks. These methods are described in an appendix in excerpts from the textbook "Wear-Inhibiting Layers", Helmut Kunst and 7 co-authors, Volume 436 *Kontakt und Studium Werkstoffe*, Expert Publishers.

Finishing of the Brake Disk:

Since, after coating, the brake disk has a relatively rough surface, a finish-machining for smoothing the surface is required. This preferably takes place mechanically by means of grinding. However, for avoiding any loss of coating material, a non-cutting finishing, for example, by means of finish-rolling can also be used. In addition, precision-turning is advantageous for finishing.

Figure 5:
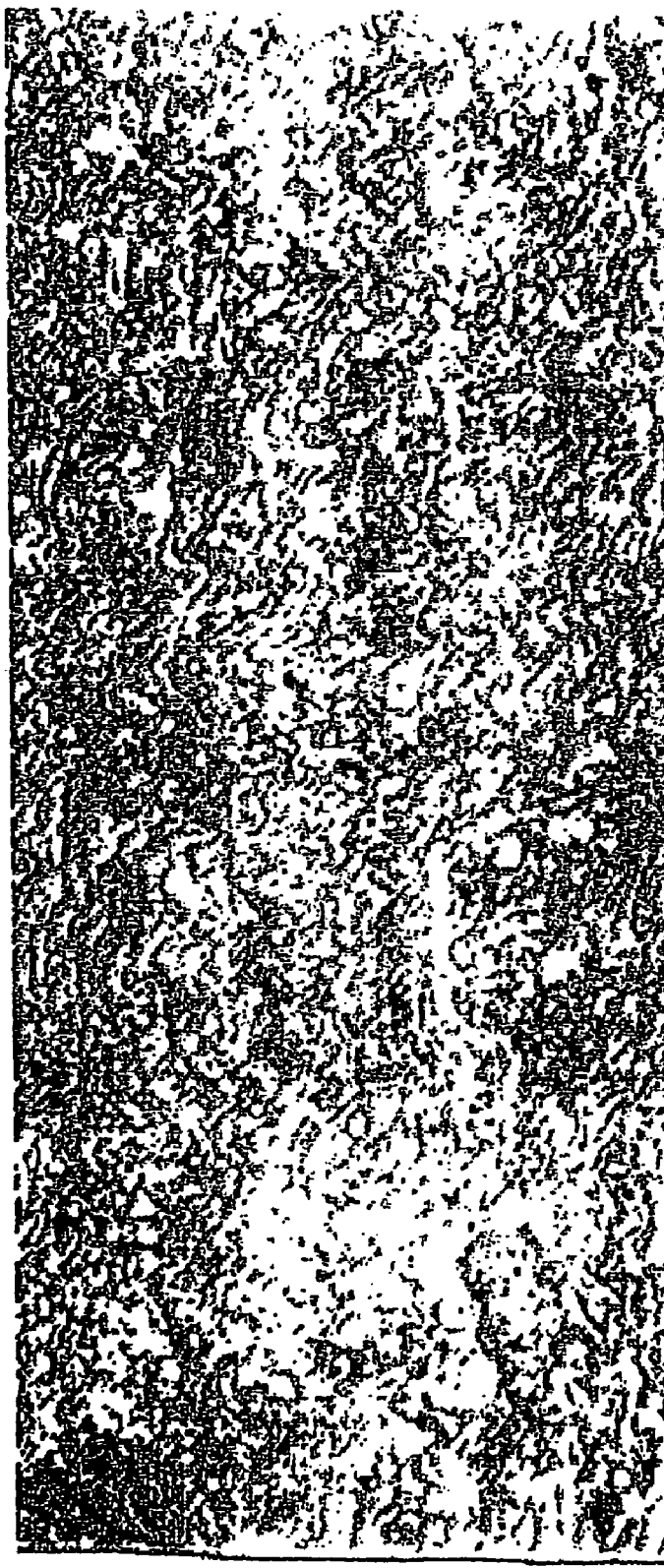
FIG. 5 is a micrograph of a coating enlarged approximately 500:1.

FIG. 5 is a micrograph, which is enlarged approximately 500:1. The micrograph of the coating shows the existing demands on the quality of the construction of the protective layer. It is important to limit the porosity. The dark points correspond to pores, thus, hollows in the layer.

Preferably, the porosity should amount to no more than 5%; that is, the fraction of dark spots in the micrograph should not be greater than 5%.

Figure 3:
FIGS. 3 and 4 are views of an enlargement of approximately 1,000:1 of the construction and distribution of hard materials increasing the wear resistance, which hard materials are indicated as light spots by means of etching.
Figure 4:

By means of an enlargement of 1,000:1, FIGS. 3 and 4 show the formation and distribution of the hard materials increasing the wear resistance, which are indicated as light spots by means of etching.

The light spots represent carbides which essentially consist of chrome carbides. However, carbides may also be formed which are the result of other alloy constituents, as well as metallic oxides which also have positive effects on the hardness and the resistance to wear of the coating.

The hardness of the coating should amount to from 350 to 500 HV1. Carbides and oxides should be present in the structure in a finely distributed manner, which, with respect to size, distribution and frequency, should preferably correspond to the type of the attached micrographs. At least 5% of the surface of the micrograph, but preferably 10 to 20% of the surface, should appear in an etched micrograph on a cross-section through the coating or the layer structure as a result of the presence of finely distributed carbides and oxides as light strips in order to form a particularly wear-resistant and effective coating.

TABLE OF REFERENCE NUMBERS

Brake disk 1
friction rings 2, 3
webs 4
ventilating duct 5
projection 6
core 7
injection-molded coating 8
collar 9
grooves 10

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disk, comprising:
   axial friction surfaces; and
   a metallic, non-ceramic coating provided on at least one of said axial friction surfaces of the brake disk,
   wherein carbides and oxides are present in the coating in a finely distributed manner, and
   wherein the carbides and oxides are constructed in the brake coating such that a micrograph of a transverse cross-section of the coating shows the presence of finely distributed metal carbides and oxides across between 5-20% of the cross-section.

* * * * *